United States Patent Office 2,763,635
Patented Sept. 18, 1956

2,763,635

PRODUCTION OF HIGH CONVERSION PLASTICIZED SYNTHETIC ELASTOMERS IN AQUEOUS EMULSION

Charles M. Tucker and Weldin G. Chapman, Borger, Tex., assignors to Phillips Petroleum Company, a corporation of Delaware No Drawing. Application August 27, 1951, Serial No. 243,918

8 Claims. (Cl. 260—84.3)

This invention relates to the polymerization of unsaturated organic compounds capable of undergoing an addition polymerization to form high molecular weight polymers. In one of its more specific aspects it relates to the polymerization of an aliphatic conjugated diene hydrocarbon, including substituted derivatives, either alone or in admixture with a monomer copolymerizable therewith to form long chain polymers of the type known as synthetic rubbers.

In the production of elastomers by emulsion polymerization processes wherein mixtures of butadiene with styrene are polymerized in an aqueous emulsion system it is well known that the properties of the product are greatly affected by the yield at which product is isolated. One desirable and commonly accepted procedure has been to stop the polymerization at around a 60 to 70 per cent conversion in order to obtain a product that is substantially free from gel and of such nature that it is fairly easy to process. Subsequent to recovery of the polymer it is compounded with sufficient plasticizer, together with other materials, to give a product having desirable properties. In the interest of economy it would be advantageous to continue polymerization reactions to much higher conversions, even to substantially complete conversion, if products having good properties could be obtained by such a method of operation. However, in many instances when attempts have been made to prepare high conversion polymers, materials that were tough and difficult to process were obtained.

It is an object of this invention to provide a process for the production of high conversion, plasticized synthetic elastomers in aqueous emulsion. Another object of this invention is to provide an improved process for the addition polymerization of unsaturated organic compounds to form high molecular weight polymers. A further object is to provide an improved process for the polymerization of aliphatic conjugated diene hydrocarbons. A still further object is to provide an improved process for the copolymerization of a butadiene hydrocarbon and a monomer copolymerizable therewith in a homogeneous system. Further objects and advantages of this invention will become apparent to one skilled in the art from the accompanying disclosure and discussion.

In accordance with an aspect of this invention in emulsion polymerization processes wherein monomers are polymerized in an emulsion system, an improvement is provided which comprises polymerizing a minor amount of the total monomeric material to a conversion of at least 50 per cent, in an aqueous emulsion system and in the presence of substantially all of the water to be used for the total aqueous phase, a major amount of the total modifier, and a sufficient quantity of the initiator and activator ingredients to obtain at least a 50 per cent conversion of said monomeric material, and subsequently adding to the initially polymerized emulsion system the remainder of the monomeric material, initiator and activator, and the remainder minor quantity of modifier. The process of this invention is particularly valuable in the production of elastomers. One method of obtaining easily processable products when following this invention, is to charge the materials to be polymerized to the reactor in two stages. The polymerization in each stage is carried out under such conditions that a final product of the desired characteristics is obtained. In the initial stage of the reaction a minor proportion of the monomeric material is charged to the reactor, i. e., less than 50 per cent of the total quantity, together with a relatively large amount of modifier, preferably more than 60 per cent of the total amount, sufficient activator and catalyst ingredients to obtain the desired conversion during this stage of the polymerization, and an amount of aqueous phase which is substantially that required for the entire process. Subsequent to charging these materials, polymerization is allowed to continue to at least 50 per cent conversion after which the remaining monomeric material, additional activator ingredients and catalyst, and a relatively small amount of mercaptan are charged. Since the activator is ordinarily prepared in aqueous medium, the total aqueous phase in the reactor will be increased slightly during this stage of the process. After all the ingredients have been charged, polymerization is continued to a conversion of at least 80 per cent and preferably higher. The temperature is maintained at a constant level throughout the reaction. The reaction is short-stopped, an antioxidant is added, and the latex is coagulated by conventional means.

Unsaturated organic compounds capable of undergoing an addition polymerization to form high molecular weight polymers may be advantageously polymerized, in accordance with the present invention. Such unsaturated organic compounds are generally those which contain a methylene group attached by an olefinic double bond to a carbon atom in the structure $CH_2=C<$. Compounds which contain the $CH_2=C<$ group and are suitable as monomers for use in the process of our invention include the following: 1,3-butadiene and its homologues and analogues which polymerize in the same manner, such as isoprene, piperylene, chloroprene, and the like; styrene; acrylonitrile; methyl acrylate; methyl methacrylate; vinyl chloride; etc. These unsaturated organic compounds are given by way of example only. The unsaturated organic compounds may be polymerized alone or in admixture with other monomers copolymerizable therewith.

Thus it is our discovery that high conversion polymers, or synthetic elastomers, can be prepared in emulsion polymerization processes wherein aliphatic conjugated diene hydrocarbons are polymerized with monomers which contain the group $CH_2=C<$ and which are copolymerizable therewith in aqueous emulsion. Such high conversion plasticized synthetic elastomers as stated can be prepared by initially emulsifying a minor amount of the total monomeric material, all of the water for the total aqueous phase except sufficient to dissolve the soluble salts to be subsequently added, a major amount of the total modifier, a sufficient quantity of the initiator, activator and/or catalysts to obtain at least a 50 per cent conversion of said monomeric material, allowing the emulsion polymerization to continue to a conversion of at least 50 per cent polymerization, adding to the initial emulsion system the remainder of the monomeric material, initiator and activator, and the remainder minor quantity of modifier. One preferred method of operation comprises polymerizing 1,3-butadiene in the first stage of the reaction and a butadiene-styrene mixture in the second stage. However, the invention is not limited to this combination of monomeric materials. One or more conjugated diolefins, or a conjugated diolefin with a monomer copolymerizable therewith, such as styrene, various substituted styrenes, etc., may be employed in the first stage of the polymerization and the same or different monomers used in the second stage. A minor amount of monomeric material is employed for the first stage of the polymerization, i. e., less than 50 parts and preferably between 5 and 30 parts, the total amount of monomeric material for the entire process being 100 parts. Polymerization in the first stage of the reaction is continued to at least 50 per cent conversion and preferably 65 per cent or more. It may be continued in this first stage to substantially complete conversion, i. e. 100 per cent, if desired. A major portion of mercaptan is used in the first stage of the polymerization, the amount usually ranging between 60 and 95 per cent of the total quantity and preferably 75 per cent or more. Substantially all the aqueous phase is charged initially. When the activator is prepared in aqueous medium, a quantity of water sufficient for this purpose is withheld from the initial charge.

The process of this invention is not limited to any particular initiator-activator system, but, for example, can be employed effectively in hydroperoxide-iron complex systems, hydroperoxide-polyamine systems and in diazothioether systems. The amounts of activator and catalyst ingredients employed in each stage of the polymerization will vary depending upon the type and amounts of monomers used, and other reaction variables. Since a minor amount of monomeric material is used for the initial charge, usually less than 50 per cent of the activator and catalyst ingredients are charged at this time.

In accordance with this invention temperatures may range from about −40° C. to about 70° C. with temperatures from −20° C. to about +50° C. usually preferred. Obviously when polymerizations are carried out in aqueous emulsion in the absence of freezing point depressants, temperatures below the freezing point of water cannot be employed. The use of various additive agents, however, makes a process of the type disclosed herein applicable at lower temperatures, and, in fact, this is one of the distinct advantages of the present invention. Inorganic salts and alcohols can be used for lowering the freezing point. An example of such a low temperature system is a glycerin-water solution, and the term "aqueous emulsion" should be construed to include the use of an aqueous medium comprising water and a sufficient amount of a water-soluble component, preferably organic, to lower the freezing point below the desired polymerization temperature. It is generally preferred that the emulsion be of an "oil in water" type, with the ratio of aqueous medium to monomeric material between about 1.1:1 and about 2.75:1, in parts by weight. At low ratios the emulsions tend to have high viscosities and at high ratios the yield per unit volume of reactor per unit of time is low. In the practice of the invention suitable means will be necessary to establish and maintain an emulsion and to remove reaction heat to maintain a desired reaction temperature. The polymerization may be conducted in batches, semicontinuously, or continuously. The total pressure on the reactants is preferably at least as great as the total vapor pressure of the mixture, so that the initial reactants will be present in liquid phase. When higher temperatures are employed, say up to about 50° C., some variations are usually introduced into the recipes. For example, in ferricyanide-diazo thioether-mercaptan recipes, the amount of ferricyanide is generally decreased as the temperature is increased.

The modifier in each recipe is preferably an alkyl mercaptan, and may be of primary, secondary, or tertiary configuration, and generally ranges from $C_8$ to $C_{16}$ compounds, but may have more or fewer carbon atoms per molecule. Mixtures or blends of these mercaptans are also frequently desirable and in many cases may be preferred to the pure compounds. The amount of modifier necessary to yield a polymer having an uncompounded Mooney viscosity within the desired range will vary depending, among other things, upon the particular recipe being used and upon the modifier (either pure mercaptan or a blend of several mercaptans) present in the recipe. The determination of the necessary amount of modifier in each case is within the skill of the art and is generally in the range of 0.2 part to 3 parts modifier per 100 parts by weight of monomers. In general, less modifier is needed to obtain the desired Mooney viscosity in the case of lower molecular weight mercaptans than with higher molecular weight mercaptans. Other modification agents known to the art, for example, dialkyl dixanthogens, diaryl mono- and di-sulfides, tetra-alkyl thiuram mono- and di-sulfides, and mecaptothiazoles, can also be used to advantage in the process of our invention.

Emulsifying agents suitable for use in the practice of our invention include fatty acid soaps, e. g., potassium laurate, and potassium oleate, rosin acid soaps, and mixtures of fatty acid and rosin acid soaps. However other emulsifying agents, such as non-ionic emulsifying agents, salts of alkyl aromatic sulfonic acids, alkyl sulfates, and the like which produce favorable results under the conditions of the reaction, can also be used in practicing our invention, either alone or in admixture with soaps. The amount and kind of emulsifier used to obtain optimum results is somewhat dependent upon the particular recipe being used, the relative amounts of monomeric material and aqueous phase, and like variables. Usually an amount between about 0.3 and 5 parts per 100 parts by weight of butadiene will be found to be sufficient, determination of the best amount for any given recipe being within the skill of the art. Throughout this disclosure when "parts" are given parts by weight based on 100 parts monomers are intended. When the amount is expressed in millimols per 100 parts of monomeric material the same units of weight throughout are used, i. e., when the monomeric material is in pounds the other material will be in millipound mols.

Suitable hydroperoxides for use in iron pyrophosphate (redox) and polyalkylene polyamine recipes and other recipes calling for an oxidant are preferably organic hydroperoxides having the formula RR'R"COOH wherein each of R, R', and R" is an organic radical, or R'R" together comprise a tetramethylene or pentamethylene group forming with

a cyclopentyl or cyclohexylhydroperoxide. Each of R, R' and R" can be completely hydrocarbon in character, and can be of mixed character, such as aralkyl, alkaryl, and the like, and can also have non-hydrocarbon substituents, some of which will have the effect of making them more water-soluble and less oil (hydrocarbon)-soluble; particularly useful non-hydrocarbon substituents include oxygen in the form of hydroxy and ether compounds, sulfur in similar compounds (i. e., mercapto compounds and thioethers), and halogen compounds. Examples of such hydroperoxides include diisopropyl hydroperoxide (isopropyl(dimethyl)hydroperoxymethane), cumene hydroperoxide (phenyl(dimethyl)hydroperoxymethane), 1-methyl-1-hydroperoxycyclopentane, tetralin hydroperoxide, phenylcyclohexane hydroperoxide, octahydrophenanthrene hydroperoxide, diisopropylbenzene hydroperoxide (dimethyl(isopropylphenyl)hydroperoxymethane), methylethyl(ethoxyphenyl)hydroperoxymethane, methyldecyl(methylphenyl)hydroperoxymethane, dimethyldecylhydroperoxymethane, methylchlorophenylphenylhydroperoxymethane, and tertiary-butylisopropylbenzene hydroperoxide (dimethyl(tertiary-butylphenyl)hydroperoxymethane).

Such hydroperoxides can be easily prepared by simple oxidation, with free oxygen, of the corresponding hydrocarbon or hydrocarbon derivative, i. e., of the parent trisubstituted methane. The compound to be oxidized is placed in a reactor, heated to the desired temperature, and oxygen introduced at a controlled rate throughout the reaction period. The mixture is agitated during the reaction which is generally allowed to continue from about one to ten hours. The temperature employed is preferably maintained between 50 and 160° C., although in some instances it might be desirable to operate outside this range, that is, at either higher or lower temperatures. At the conclusion of the reaction the oxidize dmixture may be employed as such, that is, as a solution of the hydroperoxied composition in the parent compound, or unreacted compound may be stripped and the residual material employed. The major active ingredient in such a composition is the monohydroperoxide, or a miture of monohydroperoxides. The hydroperoxide group appears to result from introduction of two oxygen atoms between the carbon atom of the trisubstituted methane and the single hydrogen atom attached thereto. Where there is another similar grouping in the molecule, the usual method of production just outlined appears to produce only the monohydroperoxide even though a dihydroperoxide appears to be structurally possible. Thus, in a simple case, from such an oxidation of diisopropylbenzene the primary product appears to be dimethyl(isopropylphenyl)-hydroperoxymethane.

One large group of these hydroperoxymethanes is that group in which each of the three substituents groups is a hydrocarbon radical. One of the subgroups of these compounds is the alkaryldialkyl hydroperoxymethanes, in which the two alkyl groups are relatively short, i. e., have from one to three or four carbon atoms each, including dimethyl(tertiary - butylphenyl)hydroperoxymethane, dimethyl(diisopropylphenyl)hydroperoxymethane, dimethyl(isopropylphenyl)hydroperoxymethane, dimethyl(dodecylphenyl)hydroperoxymethane, dimethyl(methylphenyl)hydroperoxymethane, and corresponding methyl-ethyl and diethyl compounds, and the like. Another subgroup includes at least one long alkyl group directly attached to the hydroperoxymethane, such as methyldecyl(methylphenyl)hydroperoxymethane, ethyldecylphenylhydroperoxymethane, and the like. Still another subgroup includes trialkyl compounds, such as dimethyldecylhydroperoxymethane, and the like; aralkyl compounds such as 1-phenyl-3-methyl-3-hydroperoxybutane, can also be considered to be members of this group. A further subgroup includes alkyldiaryl compounds, such as methyldiphenylhydroperoxymethane, methylphenyltolylhydroperoxymethane, and the like. A further subgroup is the triaryl compounds, such as triphenylhydroperoxymethane, tritolylhydroperoxymethane, and the like. A further subgroup comprises cyclopentyl and cyclohexyl hydroperoxides, such as result from oxidation of cyclohexane, methylcyclopentane, and phenylcyclohexane, and compounds containing condensed ring structures such as 1,2,3,4,4a,9,10,10a-octahydrophenanthrene, which forms the corresponding hydroperoxide upon oxidation, etc. The organic hydroperoxide preferably will have a total of not more than thirty carbon atoms per molecule, and the most active hydroperoxides usually have at least ten to twelve carbon atoms per molecule. Mixtures of these hydroperoxides can be used, as desired.

The amount of organic hydroperoxide used to obtain an optimum reaction rate will depend upon the polymerization recipe employed and upon the specific reaction conditions. The amount is generally expressed in millimols per 100 parts of monomers, using in each instance the same units of weight throughout, i. e., when the monomeric material is measured in pounds the hydroperoxide is measured in millipound mols. The same is true for other ingredients in the polymerization recipe. The optimum rate of polymerization is usually obtained with the amount of hydroperoxide between 0.01 and 10 millimols per 100 parts by weight of monomers.

The diazo thioethers of the present invention have the general structural formula R—N=N—S—R′ wherein R is a member of the group consisting of aromatic and substituted aromatic radicals and R′ is a member of the group consisting of aromatic, substituted aromatic, cycloalkyl, substituted cycloalkyl, aliphatic, and substituted aliphatic radicals. Desirable substituents are alkyl, chloro, nitro, methoxy, sulfo, and the like. Among preferred compounds are those more fully described in the patent to Reynolds and Cotten, U. S. Patent No. 2,501,692, granted March 28, 1950. These compounds act both as initiators and as modifiers in a polymerization recipe and hence may be used as both catalysts and modifiers in the recipe. However, it is preferred to use a modifier of the type noted above along with the diazothioether in the practice of our invention. In certain instances, it may also be desirable to use a catalyst such as potassium or sodium ferricyanide in conjunction with the diazothioether. Examples of suitable diazothioethers include 2-(2,4 - dimethylbenzenediazomercapto)napthalene, 2-(4-methoxybenzenediazomercapto)naphthalene (known in the art as MDN), 2-(2-methylbenzenediazomercapto)-naphthalene, 2 - (2,5 - dimethoxybenzenediazomercapto)-naphthalene, 4 - (2,5-dimethoxybenzenediazomercapto)-toluene, 4-(2-naphthalenediazomercapto)anisole, 2-(4-acetylaminobenzenediazomercapto)naphthalene, 2 - benbenzenediazomercapto)naphthalene, 2 - (4-sulfobenzene-diazomercapto)benzothiazole, 2-(1-naphthalenediazomercapto)napthalene, 2 - (4-chlorobenzenediazomercapto)-naphthalene, 2-(5-quinolinediazomercapto)naphthalene, 2-(4-nitrobenzenediazomercapto)naphthalene, and the like.

The type and amount of diazothioether used in a particular polymerization recipe depends upon the result desired. In general, approximately 0.2 part by weight of diazothioether per 100 parts of butadiene will give satisfactory promotion of the polymerization reaction although other proportions within the range of about 0.5 to about 5.0 parts by weight per 100 parts by weight of monomers, can be used. The diazothioether can be added in increments throughout the polymerization reaction in order to provide more uniform modification and to obtain more efficient utilization of the diazothioether. If the diazothioether is used alone to modify the polymer, somewhat larger quantities are needed than is the case if other modifiers are used in conjunction therewith.

In the case of an iron pyrophosphate (redox) recipe, the presence of a sugar or similar reducing agent is optional. Suitable reducing agents (also known as activating agents) include fructose, dextrose, sucrose, benzoin, acetylacetone, ascorbic acid, sorbitol, benzaldehyde, and the like.

When a ferrous pyrophosphate activator is used in an iron pyrophosphate (redox) recipe, it is preferably prepared by admixing a ferrous salt, such as ferrous sulfate, with a pyrophosphate of an alkali metal, such as sodium or potassium, with water and heating this mixture, preferably for the length of time required for maximum activity. A reaction occurs between the salts, as evidenced by the formation of a grayish-green precipitate. When preparing the activator the mixture is generally heated above 122° F., for variable periods depending upon the temperature. For example, if the mixture is boiled, a period of twenty minutes or less is sufficient to produce the desired activity, and the time of boiling may even be as low as 30 seconds. One convenient method of operation involves maintaining the temperature of the activator solution at about 140° F. for a period of heating ranging from 10 to 30 minutes. Prior to heating the activator mixture the vessel is usually flushed with an inert gas such as nitrogen. In general it is preferred to heat the mixture below the boiling point, say at a temperature around 130° to 165° F.

Where the activator is prepared just prior to use it is generally employed in the form of an aqueous dispersion. Since activators and initiators are added in two stages two portions of the activator in aqueous dispersion will be used. However, the solid activator may be isolated and the crystalline product used, and it is preferred in this form in some instances. Subsequent to heating the activator mixture, it is cooled to about room temperature and the solid material separated by centrifugation, filtration, or other suitable means, after which it is dried. Drying may be accomplished in vacuo in the presence of a suitable drying agent, such as calcium chloride, and in an inert atmosphere such as nitrogen. When using this crystalline product in emulsion polymerization reactions, it is generally charged to the reactor just prior to introduction of the monomers. This crystalline material is believed to be a sodium ferrous pyrophosphate complex, such as might be exemplified by the formula $$2Na_2FeP_2O_7 \cdot Na_2P_2O_7$$

or perhaps $Na_2FeP_2O_7$. In any event the complex, whatever its composition, is one active form of ferrous iron and pyrophosphate which can be successfully used in our invention. It may be incorporated in the polymerization mixture as such, or may be dispersed in water. Other forms of multivalent metal, e. g., copper, and pyrophosphate may also be used, so long as there is present in the reacting mixture a soluble form of a multivalent metal, capable of existing in two valence states and present primarily in the lower of two valence states, and a pyrophosphate.

The amounts of activator ingredients to be charged in an iron pyrophosphate recipe are usually expressed in terms of monomers charged. The multivalent metal should be within the range of 0.10 to 3 millimols per 100 parts by weight of monomers, with 0.2 to 2.5 millimols being generally preferred. The amount of pyrophosphate should be within the range of 0.10 to 5.6 millimols based on 100 parts by weight of monomers; however the narrow range of 0.2 to 2.5 millimols is more frequently preferred. The mol ratio of ferrous salt to alkali metal pyrophosphate can be between 1 to 0.2 and 1 to 3.5 with a preferred ratio between 1 to 0.35 and 1 to 2.8.

In the case of a polyalkylene polyamine recipe, the activating agent, i. e., a polyalkylene polyamine is preferably a polyethylene polyamine or a trimethylene polyamine. Suitable polyethylene polyamines have the general formula $RNH(CHXCHXNH)_m(CHXCHX)_nNHR$, where R contains not more than eight carbon atoms and is of the group consisting of hydrogen, alkyl, cycloalkyl, aromatic, olefinic, and cycloolefinic radicals, each X contains not more than three carbon atoms and is the group consisting of hydrogen and aliphatic radicals, $m$ is an integer between 0 and 8, inclusive, and $n$ is an integer of the group consisting of 0 and 1 and is 1 when $m$ is greater than 0. Each of the foregoing radicals (other than hydrogen) can be completely hydrocarbon in character, and R can be of mixed character when containing six or more carbon atoms, such as alkylcycloalkyl, aralkyl, alkaryl groups, and the like, and both R and X can also have non-hydrocarbon substituents; particularly useful non-hydrocarbon constituents include oxygen in the form of hydroxy and ether compounds, sulfur in similar compounds (i. e., mercapto compounds and thioethers), and halogen compounds. Examples of such polyamines include ethylenediamine, hydrazine, diethylenetriamine, tetraethylenepentamine, dipropylenetriamine, 2-methyl-3-azapentane-1,5-diamine, N-(2-hydroxy-ethyl)-1,2-ethanediamine, N-phenylethylenediamine, N-cyclohexyl-N'-(2-aminoethyl)-1,2-ethanediamine, N-(2-hydroxytertiary-butyl)-1,2-propylenediamine, carbamates of the foregoing and the like.

Suitable trimethylene polyamines are preferably those having the general formula

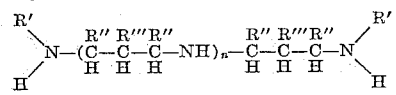

where each R' is one of the group consisting of hydrogen, methyl, ethyl, hydroxymethyl, hydroxyethyl, and carboxy radicals, each R" is hydrogen or methyl, and each R'" is hydrogen, methyl, or an activating substituent of the group consisting of —OR, —SR, —NR₂, —CN, —SCN, —COOR, —CHO, with R being hydrogen, methyl, ethyl, n-propyl, or isopropyl, or —CHR'" can be $>C=O$, and $n$ is an integer between 0 and 8 inclusive. The compounds containing a single trimethylene group together with its two terminal amine groups is preferred. The simplest of these trimethylene polyamines, or 1,3-diaminopropanes, is 1,3-diaminopropane itself. This compound is also known as trimethylenediamine. Substitution of an —OH or a =O on the central carbon atom of 1,3-diaminopropane appears to enhance the activity in the emulsion polymerization recipes, hence 1,3-diaminoacetone and 1,3-diamino-2-propanol are at present the most preferred 1,3-diaminopropanes. Other 1,3-diaminopropanes, which contain a plurality of trimethylene (unsubstituted or substituted) groups alternating with amino groups, and which are regarded as polymers of the parent compound, can also be employed; for example tri(trimethylene)tetramine (sometimes erroneously designated as tripropylenetetramine) is considered to be a polymer of trimethylenediamine. All of the polyamine compounds referred to above have the basic structure of 1,3-diaminopropane and hence can be broadly referred to as "1,3-diaminopropane and its derivatives and polymers thereof"; they can also be broadly referred to as "1,3-diaminopropanes" and also as "trimethylene polyamines." It is preferred to use only those polyamines which come within the structural formula defined hereinabove, and all of the compounds so defined are operable in our process to some extent though it will of course be appreciated that the relative activities and efficacies will vary considerably depending upon the size of the molecule and the various constituents thereof, as well as upon the other components and their proportions in the various recipes which may be used. Those skilled in the art will readily ascertain any of the specific compounds which are within the scope of the structural formula. However, by way of example the following are mentioned: 1,3-diaminopropane, 1,3-diaminoacetone, 1,3-diamino-2-propanol, N,N'-dimethyl-1,3-diaminoacetone, N-ethoxy-1,3-diamino-2-propanol, 1,3-diamino-2-carboxypropane, 1,3-diamino-2-(dimethyl-amino)-propane, 2,4-diaminopentane, 1,3-diamino-2-cyanopropane, 1,3-diamino-2-mercaptopropane, di(trimethylene)triamine, tri(tri-methylene)tetramine, tetra(trimethylene)pentamine, polytrimethylene polyamines in which the amino and trimethylene groups can be substituted as previously mentioned, and carbamates of each of the foregoing.

These polyalkylene polyamine activator compositions appear to serve as reductants and/or activators in the polymerization mixture, and no other activating ingredients, such as compounds of polyvalent-multivalent metals, need be added in order to obtain satisfactory and rapid polymerization of the monomers, except as such compounds may fortuitously be present as traces in the polymerization mixture. Similarly, no other reducing ingredient such as a reducing sugar, need be added.

The amount of polyalkylene polyamine to be used in any particular case depends upon such variables as the polyamine used, specific ingredients of recipe, and conditions of reaction. In general, amounts of polyalkylene polyamine in the range of 0.1 to 2 parts of polyalkylene polyamine per 100 parts of monomers will give satisfactory results; however greater or smaller amounts of polyamine can be used.

The following example and data illustrate in more detail our invention. However they are not to be construed as unduly limiting to the scope of the invention.

*Example*

Three polymerizations were carried out in aqueous emulsion at 5° C. charging 10 parts butadiene initially, together with 170 or 175 parts water, the total amount of emulsifier to be used during the reaction, substantially one-third of the activator and catalyst ingredients, and a major portion of the mercaptan. The butadiene was then polymerized to above 70 per cent conversion after which 72 parts butadiene and 28 parts styrene were added, together with additional catalyst and activator ingredients, and mercaptan. Polymerization was continued at the same temperature until the conversion in each case exceeded 80 per cent. Details of the recipes, conversions during the initial and secondary stages of the reaction, and final Mooney values are shown below:

A conversion of 81 per cent was obtained in 13.6 hours and the polymer had a Mooney value of 55.

The polymers were compounded according to the following receipe:

| | Parts by weight |
|---|---|
| Elastomer | 100 |
| Carbon black [1] | 50 |
| Zinc oxide | 3 |
| Softener [2] | 5 |
| Sulfur | 1.75 |

| | Run 1 | | Runs 2 | | Run 3 | |
|---|---|---|---|---|---|---|
| | Original Charge | Secondary Charge | Original Charge | Secondary Charge | Original Charge | Secretary Charge |
| Water | 175 | 5 | 175 | 5 | 170 | 10 |
| Butadiene | 10 | 72 | 10 | 72 | 10 | 72 |
| Styrene | | 28 | | 28 | | 28 |
| Rosin soap, K salt [1] | 5.0 | | 5.0 | | 5.0 | |
| Diisopropylbenzene hydroperoxide | 0.048 | 0.097 | 0.048 | 0.097 | 0.048 | 0.096 |
| $K_4P_2O_7$ | 0.088 | 0.177 | 0.088 | 0.177 | 0.088 | 0.177 |
| $FeSO_4 \cdot 7H_2O$ | 0.070 | 0.140 | 0.070 | 0.140 | 0.070 | 0.140 |
| KOH | 0.1 | | 0.1 | | 0.1 | |
| KCl | 0.4 | | 0.4 | | 0.4 | |
| Mercaptan blend [2] | 1.0 | 0.1 | 1.0 | 0.113 | | 0.35 |
| Tertiary $C_{12}$ Mercaptan | | | | | 1.5 | |
| Time, hours, initial stage | 5.6 | | 4 | | 8 | |
| Total time, hours | | 14 | | 11.0 | | 19.7 |
| Conversion, percent, initial stage | 77.8 | | 76.0 | | 71 | |
| Final conversion, percent | | 89.2 | | 84.1 | | 85 |
| Final Mooney, ML-4 | | 123 | | 89 | | 48 |

[1] Dresinate 214.
[2] A blend of tertiary $C_{12}$, $C_{14}$, and $C_{16}$ aliphatic mercaptans in a ratio of 3:1:1 parts by weight.

A control run was made in which a butadiene-styrene copolymer was prepared at 5° in the presence of liquid polybutadiene which was charged to the reactor prior to carrying out the polymerization. The recipe for this run was as follows:

| | Parts by weight |
|---|---|
| Water | 180 |
| Butadiene | 72 |
| Styrene | 28 |
| Rosin soap, K salt [1] | 4.7 |
| Tert-butylisopropylbenzene hydroperoxide | 0.104 |
| Mercaptan blend [1] | 0.35 |
| $K_4P_2O_7$ | 0.177 |
| $FeSO_4 \cdot 7H_2O$ | 0.14 |
| Dextrose | 1.0 |
| $Na_3PO_4 \cdot 12H_2O$ | 0.5 |
| Daxad-11 [2] | 0.1 |
| KOH | 0.13 |
| Liquid polybutadiene | 6 |

[1] As described above.
[2] Sodium salt of condensed alkyl aryl sulfonic acid.

| | Parts by weight |
|---|---|
| Santocure [3] | 1.05 |
| Flexamine [4] | 1.0 |
| Stearic acid | 1.0 |

[1] Philblack O, a special furnace-type, high abrasion carbon black.
[2] A blend of equal parts Circosol-2XH (a petroleum hydrocarbon softener, containing hydrocarbons of high molecular weight, in the form of a heavy, viscous, transparent, pale green, odorless liquid of low volatility; sp. gr. 0.940; Saybolt viscosity at 100° F., about 2,000 seconds) with Paraflux (an asphaltic flux).
[3] N-cyclohexyl-2-benzothiazolesulfenamide.
[4] A non-toxic powder, sp. gr. 1.10, M. P. 75–90° C., consisting of a physical mixture containing 65 per cent of a complex diarylamine-ketone reaction product and 35 per cent of N,N'-diphenyl-p-phenylenediamine.

A sample of the polymer prepared according to run No. 2 described above was compounded using the recipe given above except that 10 parts of a blend of Circosol-2XH with Paraflux was added instead of 5 parts.

All the mixes were milled and cured 30 minutes at 307° F. and the physical properties determined. The following results were obtained:

| Run No. | Mooney Values | | 80° F. | | | $\Delta T.°$ F. | Resilience, Percent | Flex Life, M | Shore Hardness | Percent, Compression Set | Extrusion | |
|---|---|---|---|---|---|---|---|---|---|---|---|---|
| | Raw ML-4 | Compounded MS-1½ | 300 Percent Modulus, p. s. i. | Tensile, p. s. i. | Percent, Elongation | | | | | | Inches/Min. | Grams/Min. |
| 1 | 123 | 65 | 1,900 | 4,040 | 480 | 64.9 | 67.4 | 5.3 | 59 | 14.3 | 36.2 | 74 |
| 2 | 89 | 50 | 1,710 | 3,980 | 550 | 65.9 | 65.7 | 7.2 | 58 | 16.1 | 31.2 | 76.5 |
| 2a [1] | 89 | 44.5 | 1,270 | 3,920 | 630 | 69.3 | 63.7 | 9.7 | 55 | 17.6 | 29.7 | 74.5 |
| 3 | 48 | 33.5 | 1,310 | 3,160 | 570 | 81.8 | 59.9 | 13.8 | 57 | 23.0 | 35.8 | 94 |
| Control | 55 | 37.5 | 1,370 | 2,810 | 500 | 78.4 | 60.7 | 9.7 | 57 | 19.5 | 36 | 89.5 |

OVEN AGED 24 HOURS AT 212° F.

| | | | | | | | | | | | | |
|---|---|---|---|---|---|---|---|---|---|---|---|---|
| 1 | | | 2,980 | 3,470 | 345 | 58.1 | 71.1 | 1.9 | 64 | | | |
| 2 | | | 2,750 | 3,350 | 355 | 59.1 | 69.6 | 4.4 | 63 | | | |
| 2a [1] | | | 2,140 | 3,450 | 420 | 60.2 | 69.3 | 6.8 | 60 | | | |
| 3 | | | 2,430 | 3,130 | 380 | 63.2 | 65.2 | 8.0 | 62 | | | |
| Control | | | 2,240 | 2,860 | 350 | 63.8 | 66.5 | 2.8 | 61 | | | |

[1] Compounded using 10 parts Circosol-2XH-Paraflux blend.

The data, supra, show that with samples compounded according to the same recipe (samples 1, 2, 3 and the control), those prepared by the method of this invention gave better aged tensile strength, modulus, and heat build-up properties. It is also noted that the samples with the lowest Mooney values (2, 2a, and 3) were superior in aged flex life to the control.

It can be seen that this invention affords a convenient method for the production of high conversion, easily processable polymers. The entire process can be carried out in a single reactor, the first ingredients are charged and polymerized, and the remaining ingredients are then added to the reactor without any separation of materials from the first stage in the polymerization. When operating according to the method of the present invention, a product of any desired Mooney value can be obtained by adjusting one or more of the variables in the reaction, such as, type and amount of monomeric material used in each stage of the reaction, amount of modifier used in each stage, extent of conversion polymerization temperature, etc. The polymers thus produced may be prepared in a sufficient state of plasticity that no additional softener need be added during compounding. In some cases, however, it may be preferred to use a softener in the compounding recipe. Polymers prepared by the present process have been found to possess higher tensile strength and modulus, and lower heat build-up properties after aging than similar polymers prepared by polymerization in the presence of a liquid conjugated diolefin polymer added prior to the polymerization.

Obviously many modifications or variations of the invention as hereinbefore set forth may be made without departing from the spirit and scope thereof and, therefore, only such limitations should be imposed as are indicated in the appended claims.

We claim:

1. A method for producing plasticized synthetic elastomers which comprises initially emulsifying a minor amount of the total monomeric material, all of the water for the total aqueous phase except sufficient to dissolve the soluble salts to be subsequently added, more than 50 parts of a modifier based on 100 parts of the total modifier, and a sufficient quantity of the initiator and activator material and polymerizing to obtain at least a 50 per cent conversion of said monomeric material, allowing the emulsion polymerization to continue to a conversion of at least 50 per cent based on the initial charge of said monomeric material, and adding to the initial emulsion system the remaining ingredients comprising said monomeric material, and polymerizing said system to a conversion of at least 80 per cent based on said total monomeric material.

2. The method according to claim 1 wherein more than 75 parts of a modifier based on 100 parts of the total modifiier is initially charged to the emulsion system.

3. A method for producing plasticized synthetic elastomers which comprises forming an emulsion of water and monomeric material, said monomeric material comprising an aliphatic conjugated diene and a compound polymerizable therewith which contains a $CH_2=C<$ group, initially emulsifying a minor amount of said total monomeric material, all of the water for the total aqueous phase except sufficient to dissolve soluble salts to be subsequently added, more than 50 parts of a modifier comprising an aliphatic conjugated diene and a compound modifier comprising alkyl mercaptan, and a sufficient quantity of the activator and initiator material and polymerizing to obtain at least a 50 per cent conversion of said monomeric material, allowing the emulsion polymerization to continue to a conversion of at least 50 per cent based on the initial charge of said monomeric material, and adding to the initial emulsion system the remaining ingredients comprising said monomeric material and the remaining quantity of said modifier comprising alkyl mercaptan, and polymerizing said system to a conversion of at least 80 per cent based on said total monomeric material.

4. The method according to claim 3 wherein from 5 to 30 parts of monomeric material based on 100 parts of said total monomeric material is initially polymerized to at least 50 per cent conversion, and wherein said modifier comprises $C_8$–$C_{16}$ alkyl mercaptans.

5. A method for producing plasticized synthetic elastomers which comprises forming an emulsion of water and monomeric material, said monomeric material comprising a mixture of major amount of a butadiene hydrocarbon and a minor amount of styrene, initially emulsifying a minor amount of said butadiene hydrocarbon not exceeding 50 parts based on 100 parts of said mixture of the butadiene hydrocarbon and styrene, a major amount of 60 to 95 parts of a modifier comprising alkyl mercaptan based on 100 parts of the total modifier comprising alkyl mercaptan, and a sufficient quantity of the initiator and activator material and polymerizing to obtain at least a 50 per cent conversion of said monomeric material, allowing the emulsion polymerization to continue to a conversion of at least 50 per cent polymerization based on the initial charge of said butadiene hydrocarbon, and adding to the initial emulsion system the remaining said monomeric material, initiator and activator, and the remaining minor quantity of said modifier comprising alkyl mercaptan, and polymerizing said system to a conversion of at least 80 per cent based on said total monomeric material.

6. The method according to claim 5 wherein from 5 to 30 parts of monomeric material based on 100 parts of said total monomeric material is initially polymerized to at least 65 per cent conversion, and wherein said modifier comprises $C_8$–$C_{16}$ alkyl mercaptans.

7. A method for producing plasticized synthetic elastomers which comprises forming an emulsion of water and monomeric material, said monomeric material comprising a mixture of butadiene and styrene, initially emulsifying a minor amount of from 5 to 30 parts of butadiene based on 100 parts by weight of said mixture of butadiene and styrene, more than 75 parts of a modifier based on 100 parts of the total modifier, and a sufficient quantity of an initiator and activator material and polymerizing to obtain a conversion of at least 65 per cent polymerization, allowing the emulsion polymerization to continue to a conversion of at least 65 per cent based on the initial charge of said butadiene, and adding to the initial emulsion system the remaining said monomeric material, initiator and activator, and the remaining minor quantity of modifier, and polymerizing said system to a conversion of at least 80 per cent based on said total monomeric material.

8. The method of claim 7 wherein polymerization reaction is conducted at a temperature in the range of −40° C. to 70° C.

References Cited in the file of this patent

UNITED STATES PATENTS

| | | |
|---|---|---|
| 2,281,613 | Wollthan et al. | May 5, 1942 |
| 2,388,685 | Guss et al. | Nov. 13, 1945 |
| 2,434,536 | Arundale | Jan. 13, 1948 |
| 2,460,300 | Le Fevre et al. | Feb. 1, 1949 |